(12) United States Patent
Fay (10) Patent No.: US 8,615,251 B2
(45) Date of Patent: Dec. 24, 2013

(54) SYSTEM AND METHOD OF COMMUNICATING POSITION DATA

(75) Inventor: Christopher Fay, New Milford, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1073 days.

(21) Appl. No.: 11/543,753

(22) Filed: Oct. 5, 2006

(65) Prior Publication Data

US 2008/0084347 A1 Apr. 10, 2008

(51) Int. Cl.
*H04W 24/00* (2009.01)

(52) U.S. Cl.
USPC ........................................ 455/456.1; 701/408

(58) Field of Classification Search
USPC .......... 455/414.2, 456.1, 456.2, 456.3, 456.6, 455/457, 559, 404.2
See application file for complete search history.

(56) References Cited

U.S. PATENT DOCUMENTS

| | | | |
|---|---|---|---|
| 5,223,844 A | 6/1993 | Mansell et al. | |
| 6,075,987 A * | 6/2000 | Camp et al. ................... | 455/427 |
| 6,868,074 B1 * | 3/2005 | Hanson ........................... | 370/328 |
| 7,308,251 B2 * | 12/2007 | Karaoguz ....................... | 455/411 |
| 2002/0077075 A1 * | 6/2002 | Ikonen et al. ................. | 455/404 |
| 2003/0055707 A1 * | 3/2003 | Busche et al. .................. | 705/10 |
| 2003/0096623 A1 * | 5/2003 | Kim ............................... | 455/456 |
| 2004/0198449 A1 * | 10/2004 | Forrester et al. ............. | 455/561 |
| 2006/0089792 A1 * | 4/2006 | Manber et al. ................ | 701/207 |
| 2006/0155461 A1 * | 7/2006 | Cho ............................... | 701/207 |
| 2006/0223534 A1 * | 10/2006 | Newberg et al. .............. | 455/436 |
| 2007/0150444 A1 * | 6/2007 | Chesnais et al. .................. | 707/3 |
| 2008/0070593 A1 * | 3/2008 | Altman et al. ................ | 455/457 |
| 2008/0090592 A1 * | 4/2008 | Tsuchiya ................... | 455/456.6 |

FOREIGN PATENT DOCUMENTS

| | | |
|---|---|---|
| EP | 1 835 771 A1 | 9/2007 |
| JP | 2005094787 A1 | 4/2005 |
| KR | 10-2005-0039411 | 4/2005 |
| WO | 2006/070877 A1 | 6/2006 |

OTHER PUBLICATIONS

"XP-002462509," Database WPI Week 200532, Apr. 7, 2005, 1 page, Derwent Publications Ltd., London, GB.
"XP-002462514," Database WPI Week 200639, Apr. 29, 2005, 1 page, Derwent Publications Ltd., London, GB.
International Search Report for International Patent No. PCT/US2007/017490, mailed on Jan. 14, 2008.
Written Opinion of the International Searching Authority for PCT/US2007/017490, mailed on Jan. 14, 2008.
A GPS Cell Phone Primer, maps-gps-info.com.
AccuTrack FAQ, accutracking.com.
Grace Aquino, Dialed in: GPS Cell Phones, pcworld.com, Mar. 22, 2004.

(Continued)

*Primary Examiner* — San Htun
*Assistant Examiner* — Magdi Elhag
(74) *Attorney, Agent, or Firm* — Toler Law Group, PC (57) ABSTRACT

Systems, methods and devices for communicating position data are disclosed. A method includes receiving a position query at a communication device. The method also includes determining a position of the communication device in response to the position query. The method also includes transmitting data related to the position from the communication device to a remote communication device of another party to a call when the position query is received while the communication device is connected to the call.

23 Claims, 6 Drawing Sheets

(56) References Cited

OTHER PUBLICATIONS

Hughes—7101 User Manual, thuraya.com, Thuraya Satellite Telecommunications Company, United Arab Emirates.
MapQuest Find Me_Frequently Asked Questions, findme.mapquest.com.
MapQuest Find Me_Home, findme.mapquest.com.
New One Button Cell Phone for Seniors Makes a Perfect Holiday Gift for Seniors Who Have Everything, Electronics and Electrical Web Directory, Oct. 27, 2004.
Live Personal Assistance Anytime, Anywhere At the Touch of the Big Red Button, onetouchcellphone.com.
OneTouch Personal Assistance Cell Phone—Frequently Asked Questions, onetouchcellphone.com.
Michael Kwan, Samsung SCH-W399 shouts out GPS directions, mobilemag.com, Apr. 3, 2006.
Laura Tigges, Emmy Anderson, Sprint Family Locator Helps Give Parents Peace of Mind, sprint.com, Apr. 13, 2006.

\* cited by examiner

SYSTEM AND METHOD OF COMMUNICATING POSITION DATA

FIELD OF THE DISCLOSURE

The present disclosure is generally related to communicating position data.

BACKGROUND

In an increasingly mobile society, mobile telephones and telecommunications have become ubiquitous. Cell phones and other mobile communication offer an increased ability to be in contact or reachable. Such devices often data communication modules. A user of a mobile communication device times, desire to communicate data wirelessly to another party.

DETAILED DESCRIPTION OF THE DRAWINGS

A communication device is disclosed that may include a position module to determine a coordinate position of the communication device. In response to receiving a position query from a user of the communication device, the communication device may send data related to the coordinate position to a remote communication device when the communication device is communicating with the remote communication device.

A method of communicating position data is disclosed that may include receiving a position query at a communication device. For example, the position query may be received from a user of the communication device. The method may also include determining a position of the communication device in response to the position query. The method may also include transmitting data related to the position from the communication device to a remote communication device of another party to the call. For example, the data related to the position may be transmitted when the position query is received while the communication device is connected to a call.

A method of communicating position data is disclosed that includes determining position data of a communication device. The method also includes determining whether the communication device is connected to a call. The method also includes selectively transmitting the position data from the communication device when the communication device is connected to the call.

Figure 1:
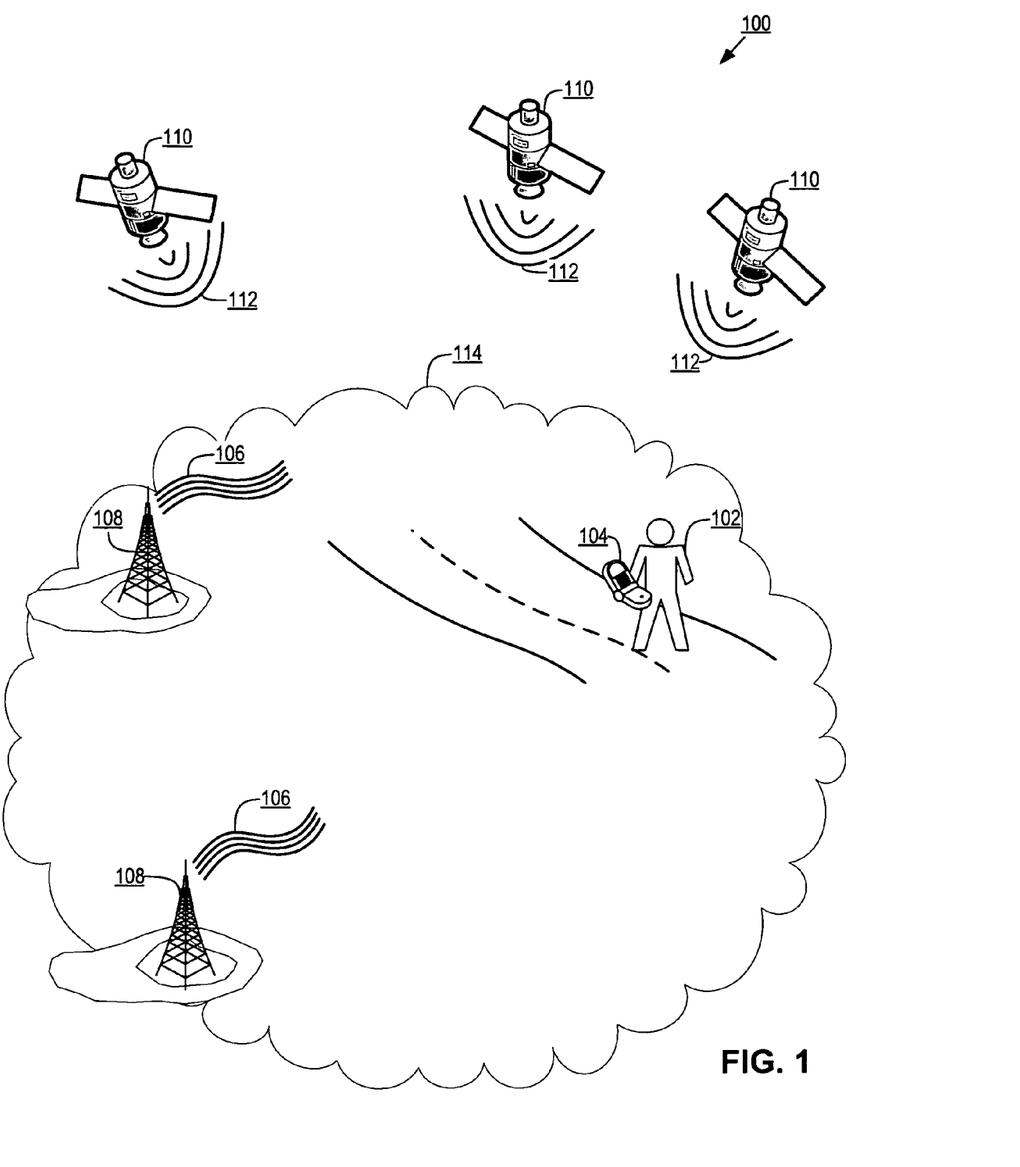
FIG. 1 is block diagram of an embodiment of a system to communicate data.

FIG. 1 depicts a first illustrative embodiment of a system 100 to communicate position data, also referred to as "location" data. The system 100 includes a communication device 104. The communication device 104 receives signals 106 from a wide area communication network 114 that includes antennas 108. The communication device 104 may send and receive signals 106 via the wide area communication network 114. The signals 106 may include communication signals to transmit data from the communication device 104 to the wide area communication network 114 or to transmit data from the wide area network 114 to the communication device 104. In a particular embodiment, the communication device 104, the communication network 114, or any combination thereof, may use information gathered from the signals 106 to determine the position of the communication device 104. For example, methods such as triangulation or trilateralization may be used to determine the position of the communication device 104 based at least partially on the signals 106.

In a particular embodiment, the system 100 may include satellites 110. The satellites 110 may transmit position signals 112. For example, the satellites 110 may include global positioning system (GPS) satellites. The communication device 104 may determine its position based at least partially on the position signals 112.

In a particular embodiment, the communication device 104 may determine its position based on both the position signals 112 and the communication signals 106. For example, the communication device 104 may be an enhanced global positioning system (EGPS) enabled device. An EGPS enabled device may use GPS signals and other local positioning system signals, such as communication signals 106, to determine its position. Examples of EGPS systems include, but are not limited to, Differential GPS (DGPS) and Wide Area Augmentation Systems (WAAS). An EGPS enabled device may use other position determinations methods or combinations of methods as well.

In a particular illustrative embodiment, the communication device 104 may receive a position query from a user 102. The position query may direct the communication device 104 to determine the position of the communication device 104. The communication device 104 may determine its position based on the signals 106, the signals 112, other signals, or any combination thereof. If the communication device 104 is connected to a call at the time that the position query is received, the communication device may transmit data related to the position to a remote communication device of another party to the call. If the communication device 104 is not connected to a call when the position query is received, the communication device 104 may display the position data on a display portion of the communication device 104 or at a display coupled to the communication device 104.

Figure 2:
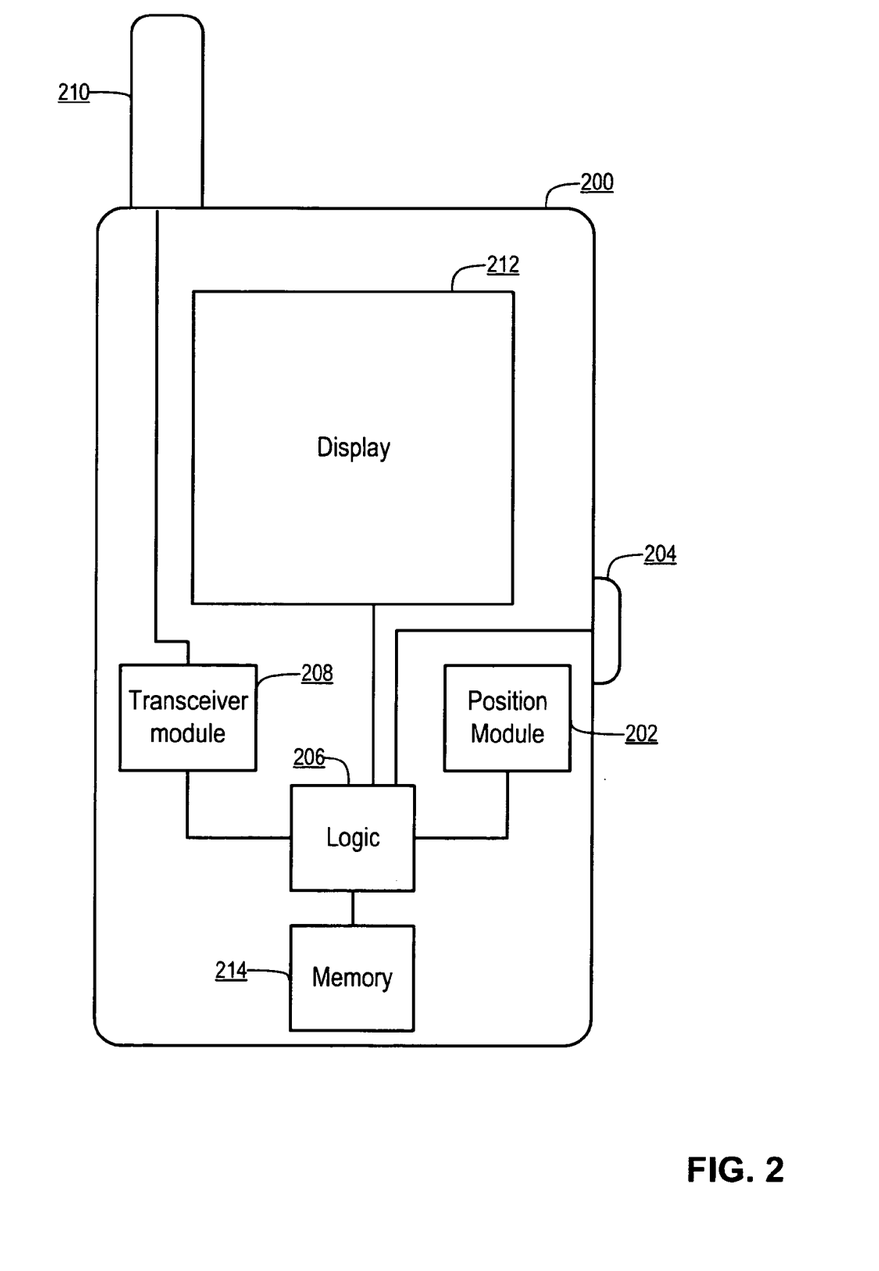
FIG. 2 is a block diagram of an embodiment of a communication device to communicate position data.

FIG. 2 depicts a particular embodiment of a communication device 200 adapted to communicate position data. The communication device 200 includes a position module 202, a position query button 204, logic 206, a transceiver module 208, a memory 214, a display 212, and an antenna 210. In an illustrative embodiment, the communication device 200 may also include other features common to communication devices such as a keypad, microphone, speaker, and so forth, as are commonly known, but not shown in FIG. 2.

In a particular embodiment, the position module 202 may determine a coordinate position of the communication device 200 in response to receiving a position query. For example, the position query may be received from a user of the communication device 200. As used herein, a "coordinate position" refers to a geographic location or other location describing where the communication device is in space or relative to geography. In an illustrative, non-limiting embodiment, the position module 202 may determine the coordinate position of the communication device 200 using global positioning technology such as, GPS or EGPS; local positioning technology, such as, triangulation or trilateralization based on communication network signals; other position determination techniques, or any combination thereof.

In an illustrative embodiment, a user may send a position query to the position module 202 by selecting of the position query button 204. In one embodiment, the position query button 204 may be a hardware button dedicated to the function of sending a position query to the position module. In another embodiment, the position query button 204 may be a software button ("soft button") or an option selectable from a menu.

In a particular embodiment, the logic 206 may coordinate communications among the display 212, the position module 202, the memory 214, the transceiver module 208, other components of the communication device 200; or any combination thereof. The logic 206 may also determine whether the communication device is connected to a call when a position query is received. If the communication device 200 is connected to a call when the position query is received the logic 206 may send data related to the coordinate position to the transceiver module 208 for communication to a remote communication device, for example, via the antenna 210. If the communication device is not connected to a call when the position query is received, the logic 206 may communicate data related to the coordinate position to the display 212 for display to the user.

In an illustrative embodiment, the logic 206 may initiate one or more position queries in order to maintain a record of position data. For example, the logic 206 may initiate position queries at regular intervals; irregular intervals; in response to certain events, such as, the communication device 200 being handed off between cells in a communication network; or any combination thereof. Further, the logic 206 may use data related to the coordinate position to generate a record of position data and store the record of position data in the memory 214. In addition, the logic 206 may send data related to the coordinate position to the transceiver module 208. The transceiver module 208 may transmit the data to a remote network device where the data may be stored as a record of position data. If the transceiver module 208 is not able to transmit the position data to the remote network device, for example, because the communication device 200 is not within range of the communication network, the position data may be stored in memory 214 and transmitted when the communication device 200 is in communication with the communication network.

The transceiver module 208 may communicate with a wireless communication network using a wireless communication protocol. The transceiver module 208 may send voice data or other data to remote devices via the wireless communication network. For example, the transceiver module 208 may send coordinate position data to a remote network device to store a record of position data. The transceiver module 208 may send voice data via the wireless communication network to remote communication devices communicating with the communication device 200 during a call. The transceiver module 208 may also send coordinate position data via the wireless communication network to remote communication devices during the call.

The display 212 may display data related to the coordinate position of the communication device 200 in a variety of formats. For example, the data related to the coordinate position may be displayed in a graphical format, such as a map. In another example, the data related to the coordinate position may be displayed in a text format such as textual coordinates or a text description of the position. The display 212 may include any type of display as is known in the art. For example, the display may be a liquid crystal display (LCD), a light-emitting diode (LED) display, a touch screen LED, an organic LED, an electronic paper device, a micro-electromechanical device, or other display.

Although only one antenna 210 is illustrated, the communication device 200 may include more than one antenna. For example, the communication device 200 may include an antenna communicating with a wide area communication network, such as an advanced mobile phone system (AMPS), a time division multiple access (TDMA) network, a code division multiple access (CDMA) network, a global system for mobile communications (GSM) network, a general packet radio service (GPRS) network, or a universal mobile telecommunications system (UMTS); an antenna for communicating with a local area communication network, such as Bluetooth network, or 802.11x network; an antenna for communicating with one or more global networks, such as the global positioning system, or a satellite communication network; other antennas; or any combination thereof.

In a particular embodiment, transceiver module 208 may be configured to receive a position query from a remote communication device. In this embodiment, the logic 206 may determine if the position query is an authorized position query. For example, the logic 206 may determine whether the position query is received from an authorized party. If the position query received from the remote communication device is an authorized position query, the logic 206 may direct the transceiver module 208 to transmit data related to the coordinate position to the remote communication device. For example, the logic 206 may send a record of data related to the coordinate position stored in memory 214 to the remote communication device. In another example, the logic 206 may send the current coordinate position determined by the position module 202 to the remote communication device.

Figure 3:
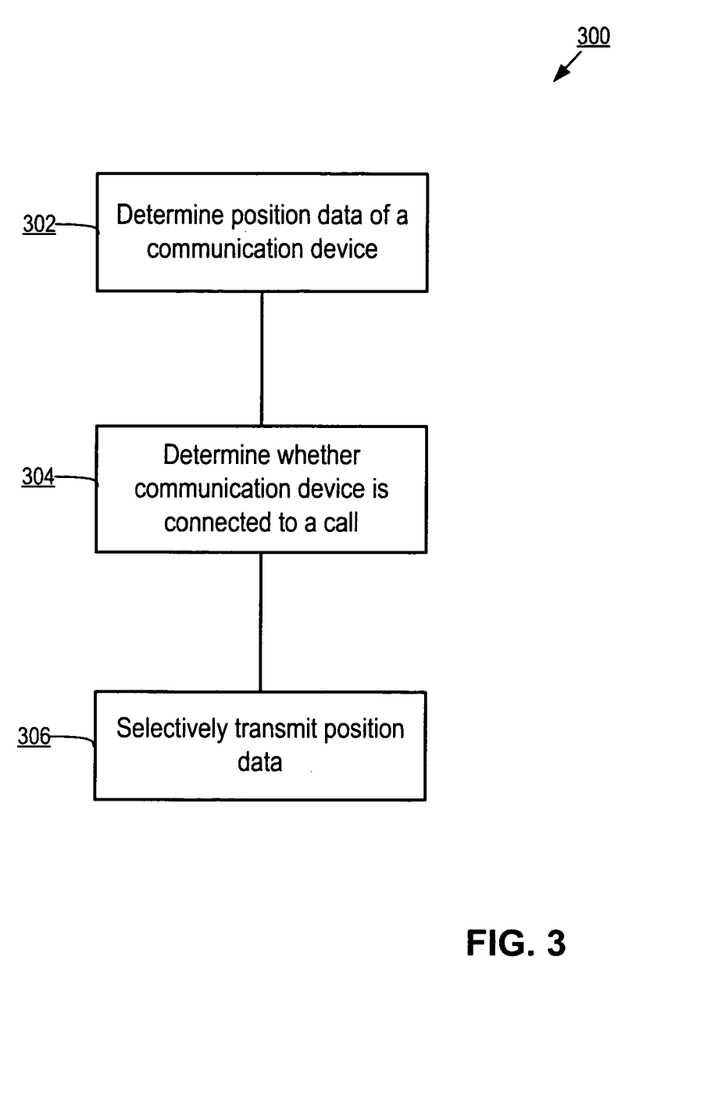
FIG. 3 is a flow chart of a first embodiment of a method of communicating data.

FIG. 3 depicts a first embodiment of a method 300 of communicating position data. The method 300 includes determining position data at a communication device, at block 302. In an illustrative embodiment, the position data may be determined periodically or in response to a position query. The method 300 also includes determining whether the communication device is connected to a call, at block 304. The method 300 also includes selectively transmitting the position data, at block 306.

In an embodiment, the method 300 may include selectively transmitting the position data when the communication device is connected to a call in response to receiving a selection of the position query button on the communication device. In an embodiment, if the position query button at the communication device is selected while the communication device is not connected to a call, the method 300 may include displaying the position data on the communication device. In an embodiment, the method 300 may also include receiving a position query from a remote party. In such an embodiment, the method 300 may include transmitting position data to the remote party if the remote party is authorized to receive the position data.

In an embodiment, the method 300 may include storing a record of position data. In such an embodiment, the method 300 may further include transmitting the record of position data when the communication device connects to an authorized call.

Figure 4:
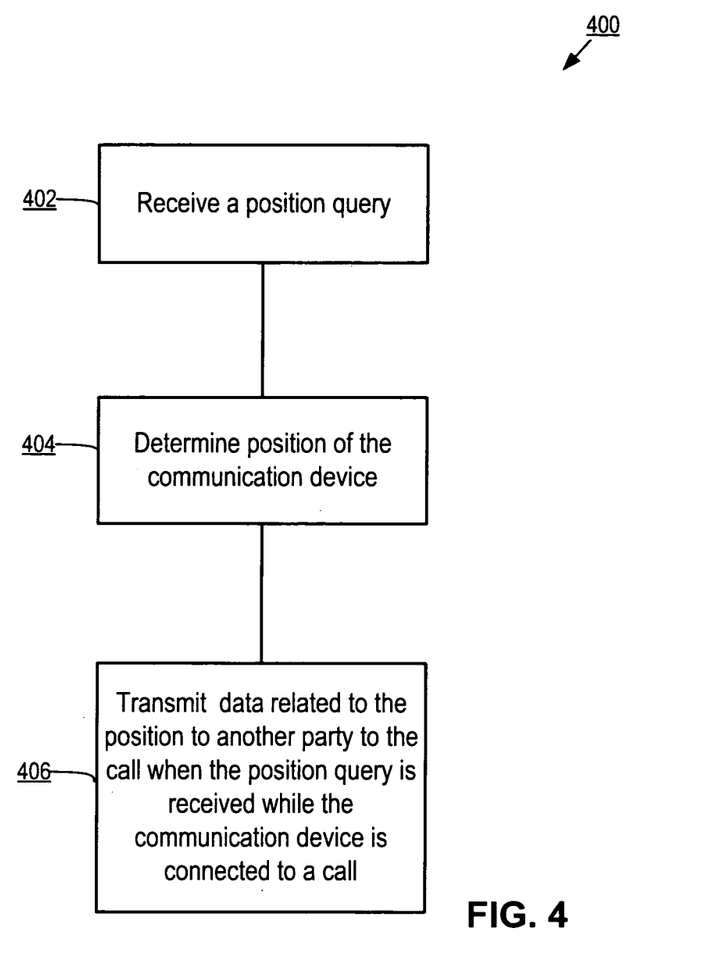
FIG. 4 is a flow chart of a second embodiment of a method of communicating data.

FIG. 4 depicts a second embodiment of a method of communicating position data. The method 400 includes receiving a position query from a user of a communication device at the communication device, at block 402. The method 400 also includes determining the position of the communication device in response to the position query, at block 404. The method 400 also includes transmitting data related to the position from the communication device to a remote communication device of another party to the call when the position query is received while the communication device is connected to a call, at block 406.

Figure 5:
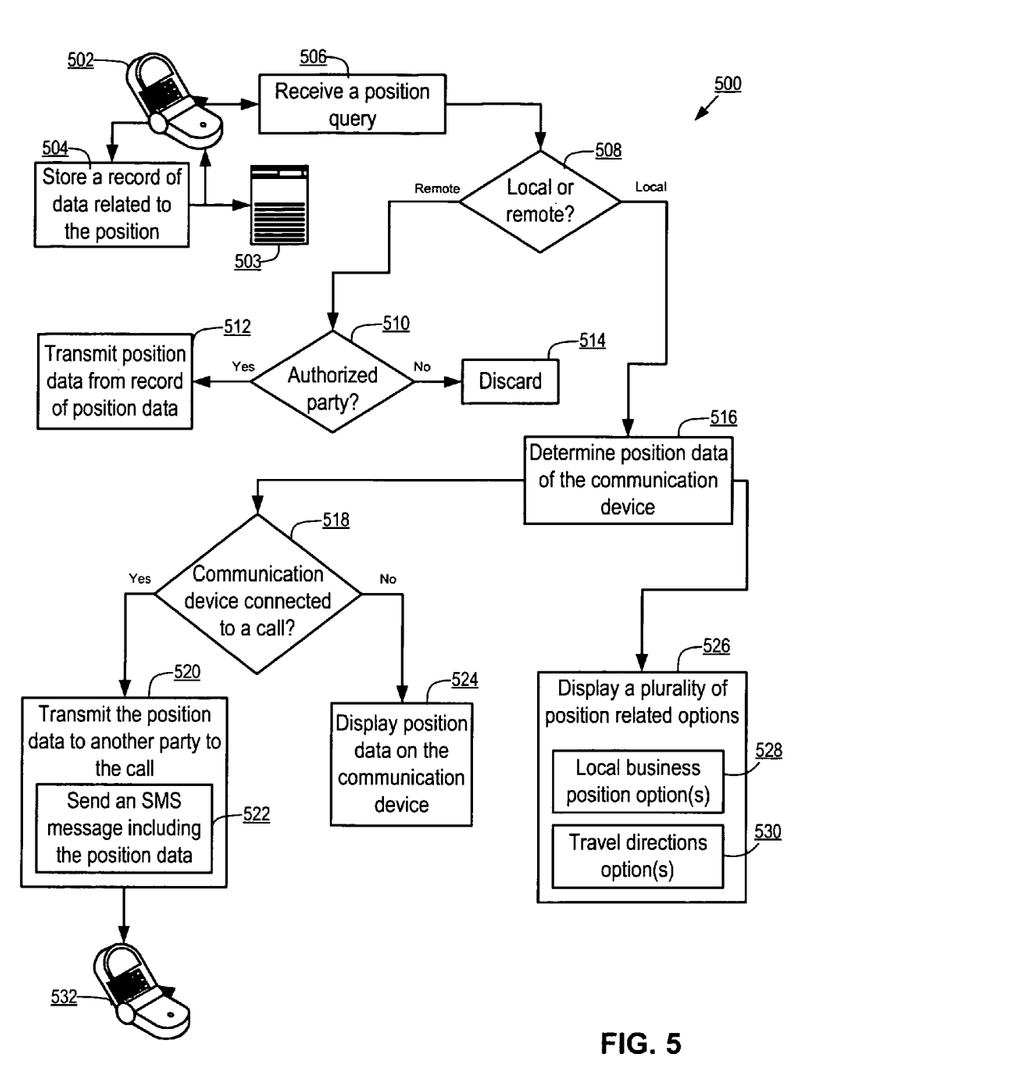
FIG. 5 is a flow chart of a third embodiment of a method of communicating data.

FIG. 5 depicts a third embodiment of a method 500 of communicating position data. The method 500 includes, at block 506, receiving a position query at a communication device 502. For example, the position query may include a user selection of a position query button at the communication device 502. In another example, the position query may be received from a remote communication device communicating with the communication device 502 via a communication network.

In an embodiment, the method 500 may include storing a record of data related to the position of the communication device 502, at block 504. For example, the communication device 502 may store the record of data related to the position in a memory of the communication device 502. In another example, the communication device 502 may transmit data related to the position of the communication device 502 via a communication network to a remote network device 503 for storage of a record of data related to the position of the communication device.

At block 508, the method 500 includes determining whether the position query is received from a local source or a remote source. A local source may include, for example, a position query button at the communication device 502. A remote source may include, for example, a remote communication device in communication with the communication device 502. If the position query is a remote position query, the method 500 proceeds to decision block 510 and the device 502 determines whether the position query is from an authorized party. If the remote position query is not from an authorized party, the position query may be discarded, at block 514. In certain embodiments, a remote position query received from the non-authorized party may be stored in memory for later reporting. If the remote position query is from an authorized party, the method 500 may include transmitting data related to the coordinate position of the communication device 502. For example, the method may include transmitting position data from a record of position data, at block 512.

Returning to block 508, if the received position query is from a local source, the method 500 may include determining the position of the communication device 502 in response to the position query, at block 516. For example, the position of the communication device 502 may be determined by methods such as GPS, EGPS, triangulation, trilateralization, other methods, or any combination thereof.

The method 500 may also include determining whether the communication device 502 is connected to a call, at block 518. For example, the method 500 may include determining whether the communication device 502 is connected to an outgoing call, that is a call initiated at the communication device 502, or to an incoming call, that is a call initiated from a remote communication device. If the communication device 502 is connected to a call when the position query is received, the method 500 include, at block 520, transmitting data related to the position from the communication device 502 to a remote communication device 532 of another party to the call. For example, in an embodiment, the data related to the position may be sent the to remote communication device 532 via a short messaging service (SMS) message including the position data, at block 522. In such an embodiment, the remote communication device 532 may be configured to display the SMS message including the position data in a text format, as a short messaging service message, or in a graphical format, such as a map.

If the communication device is not connected to a call at block 518, the method 500 may include displaying the data related to the position at the communication device 502, at block 524. For example, the data related to the position may be displayed in a text format or a graphical format.

In a particular embodiment, the method 500 may include displaying a plurality of position related options, at block 526, after determining the position of the communication device 502. For example, the plurality of position related options may include one or more local business position options, at block 528, and one or more travel direction options, at block 530, or any combination thereof. Local business position options 528 may include features such as identifying the names, addresses, and/or contact information of one or more businesses proximate to the position of the communication device 502. Local business position options 528 may also include a search feature such as a menu or text search for a particular type of business proximate to the position of the communication device 502. In an illustrative embodiment, the travel direction options 530 may include features such as walking or driving directions displayed on the communication device or given orally via a speaker of the communication device 502 to indicate to the user of the communication device 502 how to proceed from the current position of the communication device 502 to a desired location.

In a particular embodiment, the steps of the methods described herein are executed in the order shown by the figures. In alternative embodiments, the steps may be executed in alternative sequences.

In conjunction with the configuration of structure described herein, the system and method disclosed provide communication of position data. In a particular embodiment, a communication device receives a position query. The communication device determines its position in response to the position query. When the position query is received while the communication device is connected to a call, the communication device transmits data related to the position from the communication device to a remote communication device of another party to the call.

Figure 6:
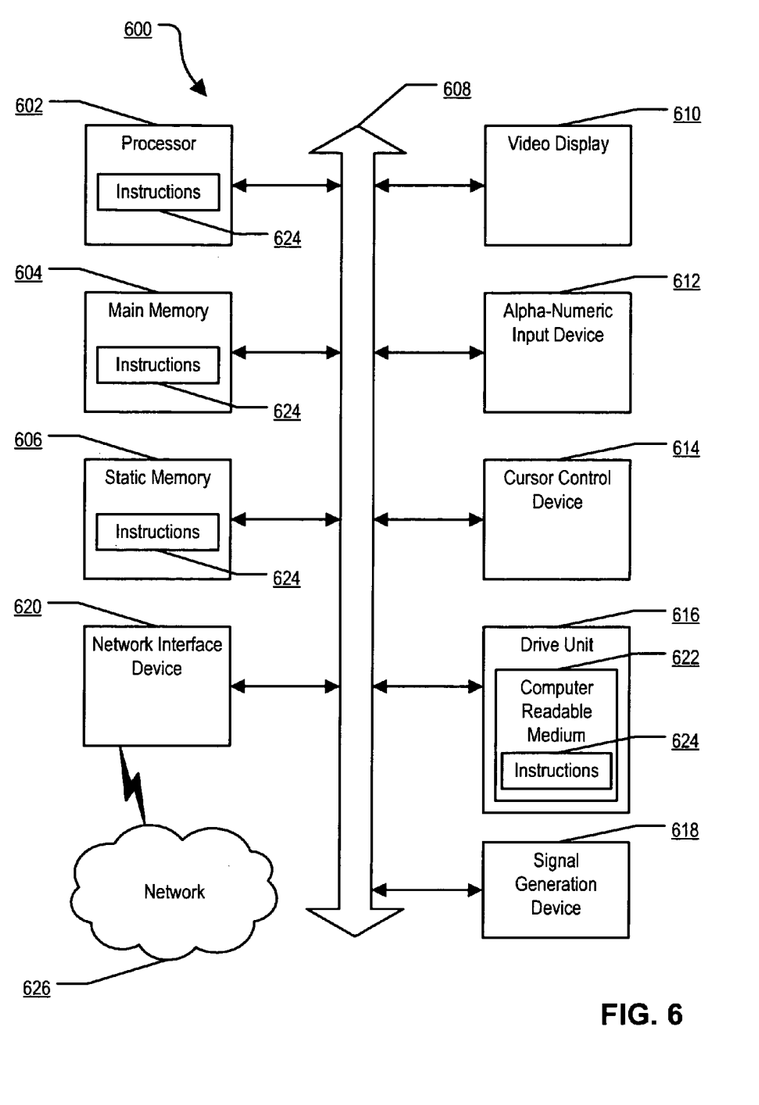
FIG. 6 is a block diagram of an illustrative general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. For example, the computer system 600 may be part of or in communication with a communication network. The computer system 600 may operate as a standalone device or may be connected, e.g., using a network, to other computer systems or peripheral devices, such as mobile network access points or other devices illustrated in FIG. 1.

In a networked deployment, the computer system may operate in the capacity of a portable communication device, remote network storage device, network access point, satellite signal system, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communication device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, hardware buttons, or soft buttons, and a cursor control device 614, such as a mouse, scroll wheel, and so forth. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Likewise, standards for wireless communication (e.g., AMPS, TDMA, CDMA, GSM, GPRS, UMTS, Bluetooth, 802.11x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    receiving position signals from a global positioning system;
    receiving communication signals from a local positioning system;
    receiving a position query at a communication device;
    determining a position of the communication device in response to the communication device being handed off between cells of a wireless communication network without the communication device receiving a request from a remote communication device to determine the position, wherein the position of the communication device is determined based on both the position signals and the communication signals;
    determining whether the position query is received from a position query button of the communication device or from the remote communication device, wherein the position query button includes a hardware button or a user selectable option of a menu and wherein the position query button is dedicated to sending position queries in response to user selections of the position query button;
    in response to determining that the position query is received from the remote communication device:
        determining whether the position query is from an authorized party;
        discarding the position query in response to determining that the position query is from an unauthorized party; and
        transmitting data related to the position from the communication device to the remote communication device in response to determining that the position query is from an authorized party; and
    in response to determining that the position query is received from the position query button:
        determining whether the communication device is in communication with the remote communication device;
        transmitting the data related to the position from the communication device to the remote communication device in response to determining that the communication device is in communication with the remote communication device; and
        displaying the data related to the position at the communication device in response to determining that the communication device is not in communication with the remote communication device.

2. The method of claim 1, further comprising storing the data related to the position as a record at the communication device when the communication device is outside a communication range of a communication network.

3. The method of claim 2, further comprising, transmitting the record stored at the communication device to a remote network device when the communication device subsequently enters within the communication range of the communication network.

4. The method of claim 1, further comprising displaying a plurality of position related options in response to the position query.

5. The method of claim 4, wherein the plurality of position related options comprises at least one local business position option.

6. The method of claim 4, wherein the plurality of position related options comprises at least one travel directions option.

7. The method of claim 1, wherein the data related to the position is transmitted via a short message service message.

8. The method of claim 1, further comprising storing a record of the data related to the position at the communication device.

9. The method of claim 8, further comprising transmitting data related to the record in response to receiving a second position query from an authorized party.

10. The method of claim 1, wherein the communication device is in communication with the remote communication device when the communication device is connected to the remote communication device via an incoming call.

11. The method of claim 1, wherein the communication device is in communication with the remote communication device when the communication device is connected to the remote communication device via an outgoing call.

12. The method of claim 1, wherein when the communication device is not in communication with the remote communication device, more than one position query is initiated at the communication device to maintain a record of position data.

13. A communication device, comprising:
    a position query button including a hardware button or a user selectable option of a menu, wherein the position query button is configured to send position queries in response to user selections of the position query button;
    a receiver module configured to receive a position query;
    a position module configured to determine a position of the communication device in response to the communication device being handed off between cells of a wireless communication network without the communication device receiving a request from a remote communication device to determine the position, wherein the position is determined based on position signals received from a global positioning system, a local positioning system, or any combination thereof;
    a transceiver module
    a display;
    a processor; and
    a memory storing instructions executable by the processor to:
        store data related to the position when the position is determined while the communication device is not in communication with the remote communication device:
        determine whether the position query is received from the position query button or from the remote communication device;
        in response to determining that the position query is received from the remote communication device:

determine whether the position query is from an authorized party;
discard the position query in response to determining that the position query is from an unauthorized party; and
initiate transmission, via the transceiver module, of data related to the position from the communication device to the remote communication device in response to determining that the position query is from an authorized party; and in response to determining that the position query is received from the position query button:
determine whether the communication device is in communication with the remote communication device;
initiate transmission, via the transceiver module, of the data related to the position from the communication device to the remote communication device in response to determining that the communication device is in communication with the remote communication device; and
initiate display of the data related to the position at the display in response to determining that the communication device is not in communication with the remote communication device.

14. The communication device of claim 13, wherein the is instructions are further executable to generate a record of the data related to the position.

15. The communication device of claim 14, wherein the transceiver module is further configured to:
receive the record from the logic; and
transmit the record to a remote network device.

16. The communication device of claim 13, wherein the memory is configured to store a record of the data related to the position.

17. The communication device of claim 16, wherein the communication device transmits the record to the remote communication device in response to receiving an authorized position query from the remote communication device.

18. The communication device of claim 13, wherein the position module includes a global positioning system (GPS) module.

19. The communication device of claim 13, wherein the position module includes an enhanced global positioning system (EGPS) module.

20. The communication device of claim 13, wherein when the communication device is not in communication with the remote communication device, more than one position query is initiated at the communication device to maintain a record of position data.

21. A computer readable storage device storing instructions that, when executed by a processor, cause the processor to perform operations comprising:
receiving position signals from a positioning system;
receiving a position query at a communication device;
determining position data of a communication device based on the position signals, wherein the position data is determined in response to the communication device being handed off between cells of a wireless communication network without the communication device receiving a request from a remote communication device to determine the position;
determining whether the position query is received from a position query button of the communication device or from the remote communication device, wherein the position query button includes a hardware button or a user selectable option of a menu and wherein the position query button is dedicated to sending position queries in response to user selections of the position query button;
in response to determining that the position query is received from the remote communication device:
determining whether the position query is from an authorized party;
discarding the position query in response to determining that the position query is from an unauthorized party; and
transmitting data related to the position from the communication device to the remote communication device in response to determining that the position query is from an authorized party; and
in response to determining that the position query is received from the position query button:
determining whether the communication device is connected to a call with the remote communication device;
transmitting the position data from the communication device in response to determining that the communication device is connected to the call with the remote communications device; and
displaying the position data at the communication device in response to determining that the communication device is not connected to the call with the remote communications device.

22. The computer readable storage device of claim 21, wherein the position signals include global positioning system signals, local positioning signals, or any combination thereof.

23. The computer readable storage device of claim 21, wherein the operations further comprise transmitting the position data from the communication device to the remote communications device without the communication device receiving a request from the remote communications device to communicate the position data.

* * * * *